(12) United States Patent
Nguyen et al.

(10) Patent No.: US 7,362,430 B2
(45) Date of Patent: Apr. 22, 2008

(54) RAMAN SPECTROMETRY APPARATUS

(75) Inventors: Quy Dao Nguyen, Gif sur Yvette (FR); Edouard Da Silva, Lille (FR)

(73) Assignee: Horiba Jobin Yvon, Inc., Edison, NJ (US)

( * ) Notice: Subject to any disclaimer, the term of this patent is extended or adjusted under 35 U.S.C. 154(b) by 82 days.

(21) Appl. No.: 10/519,529

(22) PCT Filed: Jun. 26, 2003

(86) PCT No.: PCT/FR03/01982

§ 371 (c)(1),
(2), (4) Date: Jun. 6, 2005

(87) PCT Pub. No.: WO2004/003496

PCT Pub. Date: Jan. 8, 2004

(65) Prior Publication Data

US 2005/0248757 A1      Nov. 10, 2005

(30) Foreign Application Priority Data

Jun. 28, 2002    (FR) ................................. 02 08156

(51) Int. Cl.
*G01J 3/44*      (2006.01)
*G01N 21/65*    (2006.01)

(52) U.S. Cl. ..................................................... 356/301
(58) Field of Classification Search ................. 356/301
See application file for complete search history.

(56) References Cited

U.S. PATENT DOCUMENTS 5,424,825 A     6/1995   Delhaye et al.

5,661,557 A * 8/1997 Da Silva et al. ............ 356/301

OTHER PUBLICATIONS

Michael M. Carrabba, The Utilization of a Holographic Bragg Diffraction Filter for Rayleigh Line Rejection in Raman Spectrography, Applied Spectrography, 1990, p. 1558-1561, vol. 4, No. 9, The Society for Applied Spectroscopy, Baltimore, Maryland, USA.

International Search Report for PCT/FR03/01982, Mailed Nov. 17, 2003.

* cited by examiner

*Primary Examiner*—F. L. Evans
(74) *Attorney, Agent, or Firm*—Anthony H. Handal; Brown Rudnick Berlack Israels LLP

(57) ABSTRACT

The invention concerns a Raman spectrometry apparatus containing a source of excitation (14), optical means (16) of excitation directing a beam of excitation (15) derived from that source on the sample (17), means (18) for collecting the energy diffused by the sample (17) containing an inlet diffusion slot (19), a spectral dispersion system (20), means for selecting the Raman energy (23), a detector (22), optical detection means (21) directing the Raman energy thus collected and selected to the detector (22). According to the invention, the optical means (16) of excitation cause the beam of excitation (15) to be dispersed by the dispersion system (20), said optical means (16) of excitation containing an inlet slot (24) and an outlet slot of excitation constituted by the inlet diffusion slot (19) and selecting the wavelength of excitation.

16 Claims, 3 Drawing Sheets

RAMAN SPECTROMETRY APPARATUS

The present invention concerns a Raman spectrometry apparatus.

Numerous laser Raman spectrometry assemblies are known. These assemblies include, generally, a laser 1 which may illuminate a macrometric or micrometric sample 2 under microscope (FIG. 1). The Raman light thus diffused is then filtered by a holographic filter 3, dispersed by a spectrometer 4 and analysed by a multichannel detector 5. The signals derived from the multichannel detector are stored and processed by a processing unit 6, for example, a computer.

The object of the patent is to adapt, to the Raman spectrometry, new optoelectronic devices available on the market to provide an automated apparatus.

In particular, new "solid" lasers are available providing sufficient illuminating powers at very competitive prices. However, whereas for gas lasers, the spurious rays 7 emitted on top of the useful laser ray 8 are easily filterable with, for example, an interferential filter, the "solid" lasers have the shortcoming of emitting, on top of the central ray 9, a continuous background 10 or of having an excessive spectral width (FIG. 2). These lasers may, on the other hand, change mode or, relative to the temperature, change emission frequency very slightly.

It is therefore compulsory, in a simplified apparatus, to control this frequency with precision.

One may of course associate a spectrometer with the laser to control the width of the ray, the background and the emission frequency. But this operation (FIG. 3) requires additional optics 11, 12 as well as an independent correction device 13 which must also correct the spectrometer Raman. There results increased complication of the installation.

The object of the present invention is to provide a Raman spectrometry apparatus, simple in its design and in its operating mode, very quick and economic enabling to use the same dispersion system for filtering and for detection and thereby enabling, advantageously, when correcting the wavelength of laser excitation, to correct the displacement of the Raman spectrum, automatically.

To this end, the invention concerns a Raman spectrometry apparatus containing:
a source of excitation,
optical means of excitation directing a beam of excitation derived from that source on the sample,
means for collecting the energy diffused by the sample containing an inlet diffusion slot,
a spectral dispersion system, means for selecting the Raman energy,
a detector,
optical detection means directing the Raman energy thus collected and selected to the detector.
According to the invention,
the optical means of excitation cause the beam of excitation to be dispersed by the dispersion system, and
said optical means of excitation containing an inlet slot and an outlet slot of excitation constituted by the inlet diffusion slot and selecting the wavelength of excitation.

In different embodiments, the present invention also concerns the following characteristics which should be considered individually or according to all their technically possible combinations:
the inlet slot of excitation lies in the focal plane of the dispersion system,
the means of selection of the Raman energy include a holographic filter which stops the wavelength of excitation,
the means of selection of the Raman energy include an operatable micromirror reflective system,
means for sampling a portion of the beam of excitation are placed between an outlet slot of excitation and the sample and enable to control the wavelength of excitation at its maximum of energy by the rotation of the dispersion system.

In different possible embodiments, the invention will be described more in detail with reference to the appended drawings wherein.

Figure 1:
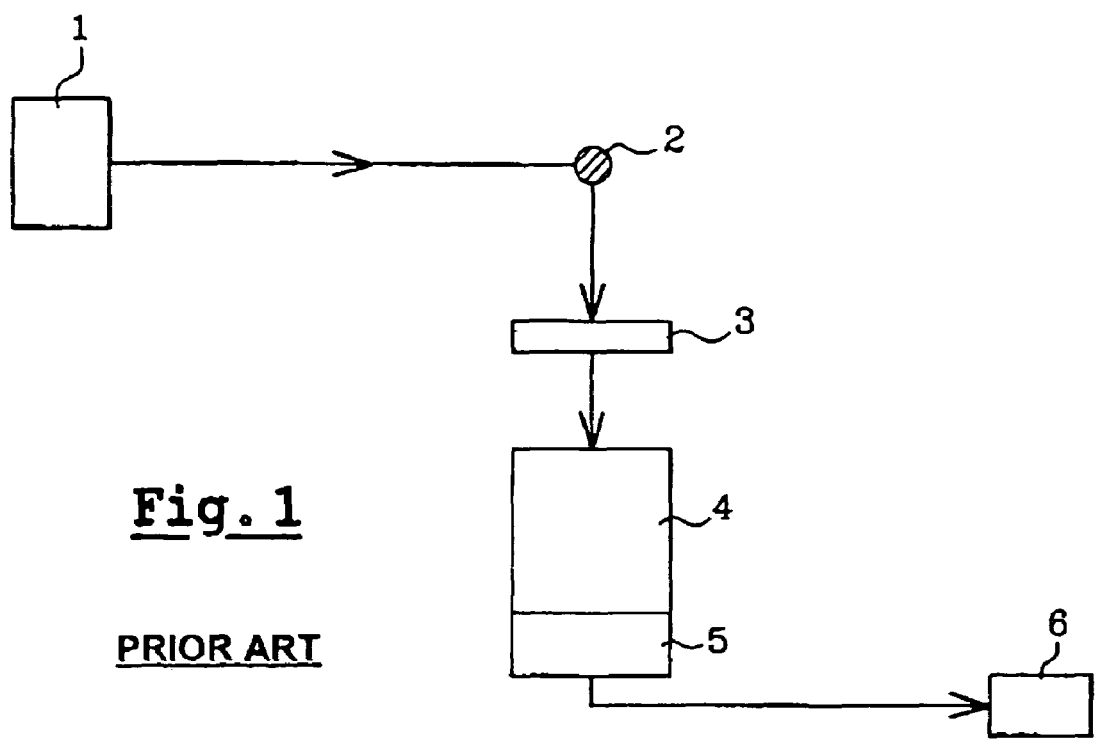
FIG. 1 is a schematic representation of a Raman spectrometry apparatus of the previous art.
Figure 2:
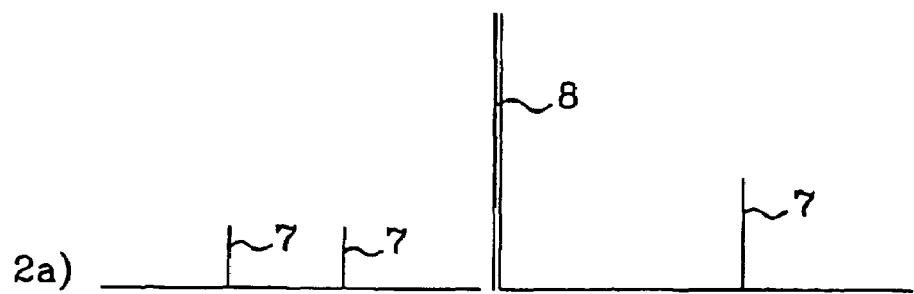
FIG. 2 is an example of an emission spectrum of a gas laser (FIG. 2a) and of en emission spectrum of a solid laser (FIG. 2b)
Figure 2:
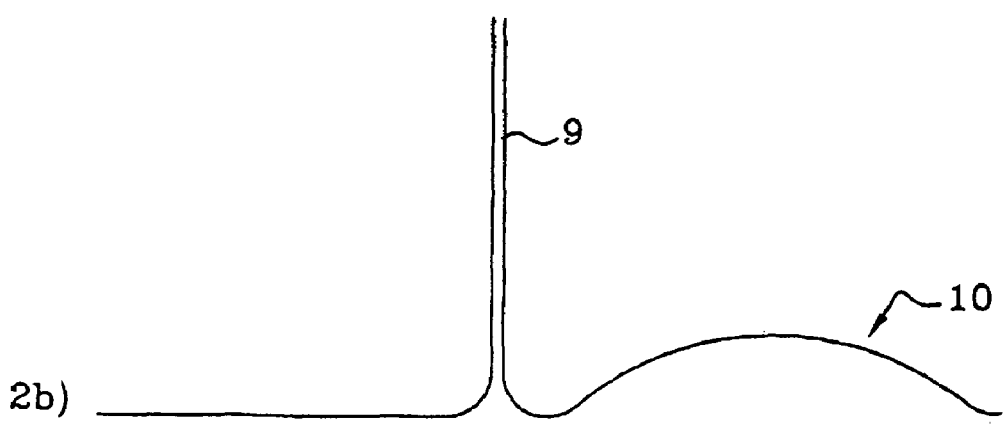
Figure 3:
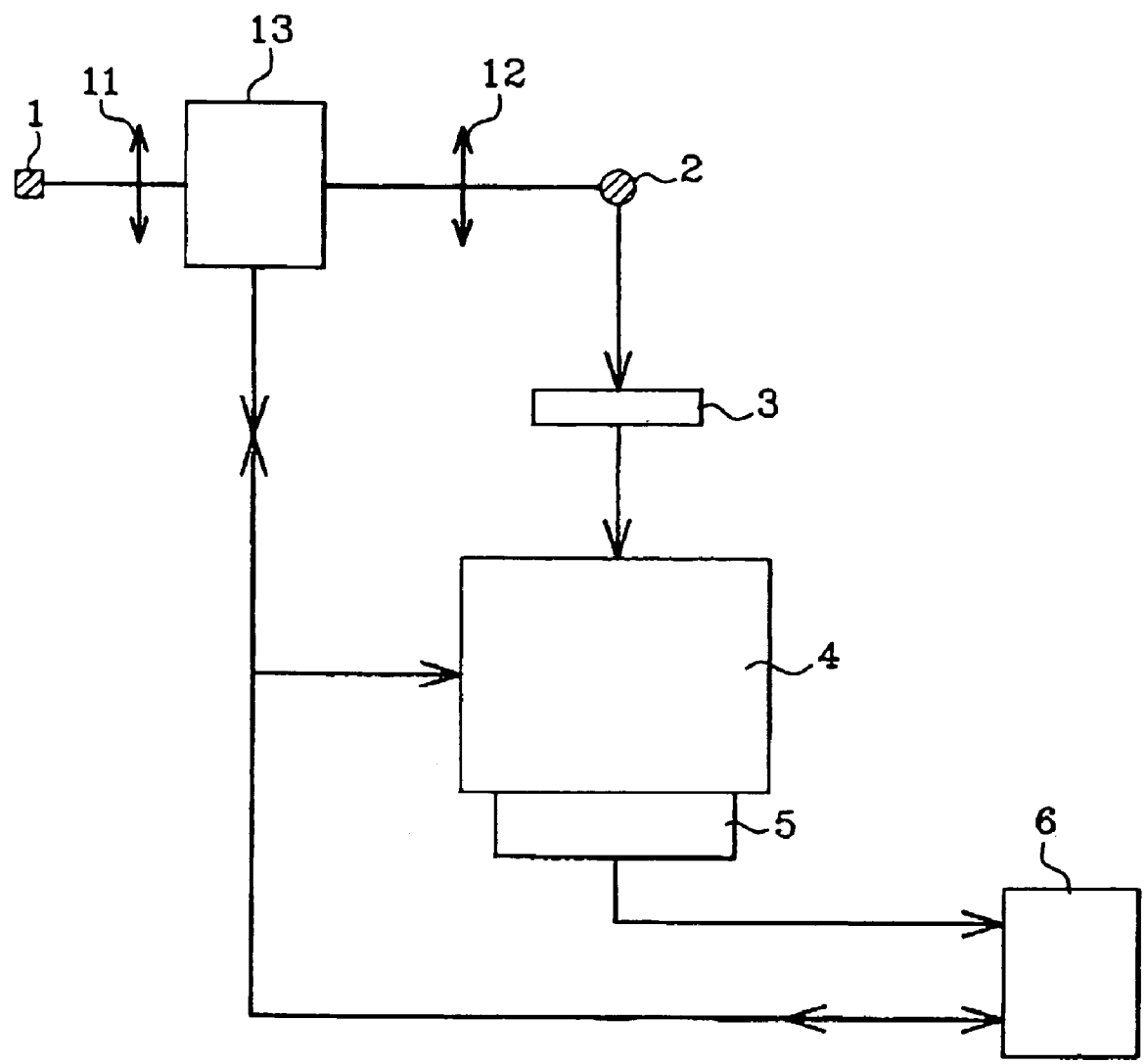
FIG. 3 is a schematic representation of a Raman spectrometry apparatus containing a spectrometer, according to the previous art.
Figure 4:
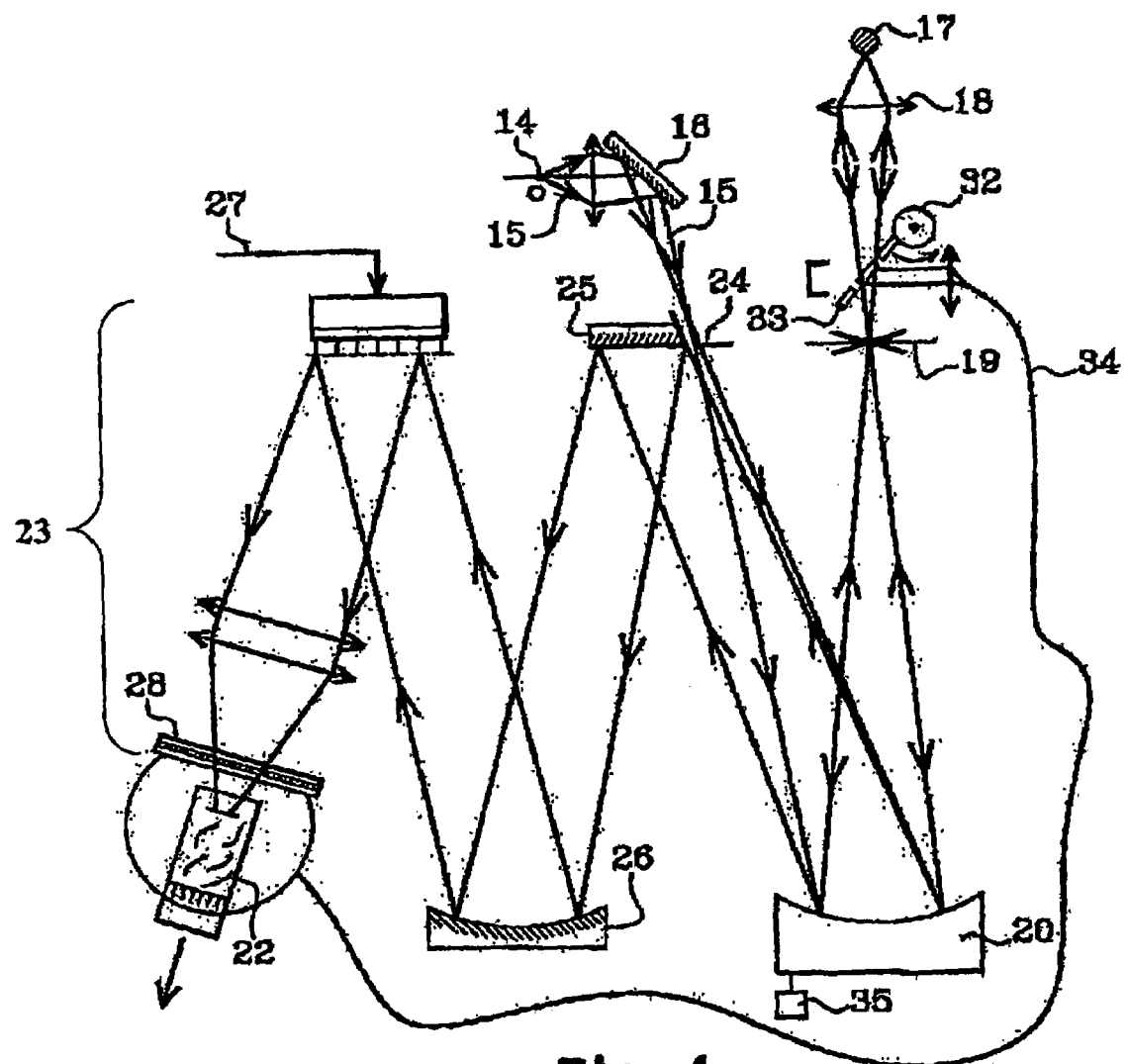
FIG. 4 is a schematic representation of a Raman spectrometry apparatus, according to the present invention.

The Raman spectrometry apparatus, according to the invention, contains a source of excitation 14, for example, a solid laser emitting a beam of excitation 15. Optical means 16 of excitation direct said beam of excitation 15 on a sample 17 to be analysed by resorting to the disperser 20. The energy diffused by the sample 17, resulting from the interaction thereof with the beam of excitation 15, is collected by collection means 18 containing an inlet diffusion slot 19. After passing through said slot 19 the energy collected is sent over a spectral dispersion system 20 generally a grid. Optical detection means then direct the Raman energy thus collected and selected to a detector 22. The apparatus also contains means for selecting 23 the Raman energy which are placed preferably in front of said detector 22.

According to the invention, the optical means of excitation cause the beam of excitation 15 to be dispersed by the dispersion system 20, said optical means of excitation containing a reflector 16, an inlet slot 24 and an outlet slot of excitation constituted by the inlet diffusion slot 19 and selecting the wavelength of excitation.

In a preferred embodiment, the inlet slot 24 of excitation lies in the focal plane of the dispersion system 20.

The invention is illustrated by the embodiment described below.

The Raman energy diffused by the sample 17 is collected by collection means 18 including a wide opening lens for the macrosamples or by a microscope lens for the microsamples. This energy is focused on the inlet diffusion slot 19 and dispersed by a dispersion system 20, for example a holographic grid. The spectrum is formed on optical detection means including a planar mirror 25, it is taken up by a spherical mirror 26 and re-formed on means for selecting the Raman energy containing, for example, an optoelectronic device with calculator-controlled micromirrors 27.

These micromirrors 27 enable to send a selected spectral energy to a detector 22 which is generally a photomultiplier or an avalanche diode.

The means of selection of the Raman energy also include a holographic filter 28 stopping the laser ray. Said filter is placed between the detector 22 and the focal plane, preferably in front of the detector 22, it enables to stop the laser ray diffused by the sample 17 as well as the laser energy diffused by the laser 14 inside the spectrometer.

Figure 5:
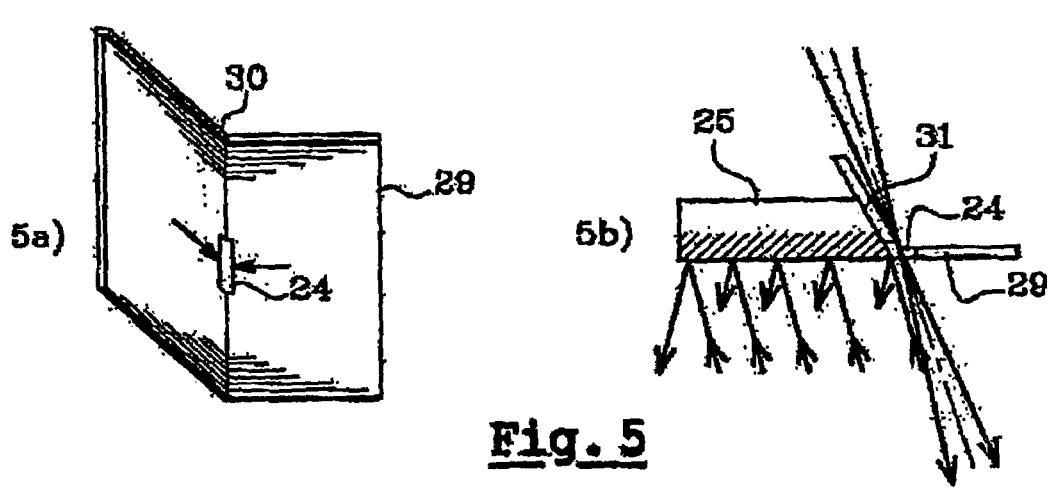
FIG. 5 represent schematically an embodiment of the inlet slot of excitation (FIG. 5a) as well as its position in the Raman spectrometry apparatus (FIG. 5b) according to the invention.

The laser 14 emits a beam 15 which is sent into the spectrometer by a slot 24 placed very close to the planar mirror 25 transmitting the spectrum (FIG. 5 a) and cut in a very thin metal blade 29 (a few ten micrometers) blackened inside and on the ridge 30 of which is cut a slot of several hundredth mms in width and several mms in height (FIG. 5 b). This metal part wherein the slot is cut, may be glued to the bevel 31 of the planar mirror 25, so that the slot 24 lies precisely on the focal plane of the Raman spectrum.

The beam 15 goes into the spectrometer and comes out through the inlet diffusion slot 19 with the same spectral resolution as the Raman spectrum which it is going to generate. The spurious background possibly present of the laser is subtracted as well as the spectral width is reduced to the resolution of the slot.

By reason of the reverse path of the light, the beam 15 touches the sample 17 at a point which will emit the Raman light analysed.

The apparatus comprises moreover means for sampling a portion of the beam of excitation. These means are placed between the inlet diffusion slot 19 and the sample 17. They enable to control the wavelength of excitation so that it lies at its maximum of energy. This control of the wavelength of excitation is operated by microrotation of the dispersion system 20. In an embodiment, these sampling means include a motor 32 acting on a blade 33 to send back a fraction of the laser light to an optic fibre 34. This optic fibre 34 carries the sampled energy to the detector 22 which conducts the measurement.

To look for the centre of the laser ray, a piezoelectric element 35 placed behind the dispersion system, enables displacements of a fraction of degree. This piezoelectric element acts to place the dispersion system 20 so that the laser 14 lies at the maximum of its intensity. This system enables advantageously by the use of a same dispersion system to correct the wavelength of excitation and to disperse the Raman energy, to correct automatically the displacement of the Raman spectrum without any additional adjustment of the apparatus.

One may analyse the spectre point-by-point while sending the energy of each mirror composing the optoelectronic device with micromirrors 27 during a same period on the detector 22, one will obtain a single-channel spectrum.

But one may also, thanks to pre-established, available, tables look for the characteristic frequencies of a body. By way of example, if one is looking for the presence of an alcohol by selecting the characteristic spectral regions, one may differentiate two alcohols of similar chemical nature. The apparatus keeps in memory the characteristic frequencies of the solids or of the liquids and thanks to indications given by the user, it may select the frequencies to be used and give the probability of presence of a body, the probability increases with time (by looking up more and more spectral elements) until definite and exact identification.

The invention claimed is:

1. A Raman spectrometry apparatus containing a source of excitation, optical means of excitation directing a beam of excitation derived from that source on the sample containing an inlet diffusion slit, a spectral dispersion system, means for selecting the Raman energy, a detector, optical detection means directing the Raman energy thus collected and selected to the detector, characterized in that the optical means of excitation causes the beam of excitation to be dispersed by the dispersion system, said optical means of excitation containing an inlet slit and an outlet slit of excitation constituted by the inlet diffusion slit and selecting the wavelength of excitation, characterized in that said means for selecting the Raman energy includes an operatable micromirror reflective system.

2. The Raman spectrometry apparatus according to claim 1 wherein the inlet slit of excitation lies roughly in or about the focal plane of the dispersion system.

3. The Raman spectrometry apparatus according to claim 1, characterized in that the means of selection of the Raman energy comprises a holographic filter which stops the wavelength of excitation.

4. Raman spectrometry apparatus according to claim 1, characterized in that means for sampling a portion of the beam of excitation is placed between an output excitation slit and the sample and enables control of the wavelength of excitation at its maximum of energy by microrotation of the dispersion system.

5. A Raman spectrometry apparatus comprising a source of optical excitation source producing optical excitation energy, an optical train for receiving said optical excitation energy and directing said optical excitation energy on a sample through an inlet slit, a spectral dispersion system, a Raman energy selection device, a detector positioned to receive said selected Raman energy, optical detection means directing the Raman energy thus collected and selected to the detector, said optical excitation source causing said optical excitation energy to be dispersed by said spectral dispersion system, and said optical train comprising an output slit and selecting the wavelength of excitation, said Raman energy selection device comprising an operatable micromirror reflective system.

6. The Raman spectrometry apparatus of claim 1 wherein the inlet slit of excitation lies in a focal plane common to the spectral dispersion system.

7. The Raman spectrometry apparatus of claim 1 further comprising a sampler between the output slit and the sample, wherein the sampler samples a portion of the optical excitation energy and controls the wavelength of excitation at its maximum of energy by microrotation of the dispersion system.

8. A spectrometry apparatus comprising:
   an excitation source producing excitation energy;
   an excitation director guiding said excitation from the excitation source onto a sample;
   a collector receiving energy diffused by the sample;
   a spectral dispersion system receiving energy diffused by said sample and collected by said collector outputting spectrally dispersed diffused energy;
   a micromirror reflective system for receiving the output of said spectral dispersion system, and comprising micromirrors and a controller for orienting said micromirrors to select a wavelength;
   a detector for receiving the output of said micromirror reflective system.

9. The Raman spectrometry apparatus according to claim 2, characterized in that the means of selection of the Raman energy includes a holographic filter which stops the wavelength of excitation.

10. The Raman spectrometry apparatus according to claim 2, characterized in that means for sampling a portion of the beam of excitation are placed between an outlet slit of excitation and the sample and enable to control the wavelength of excitation at its maximum of energy by microrotation of the dispersion system.

11. The Raman spectrometry apparatus according to claim 3, characterized in that means for sampling a portion of the beam of excitation are placed between an outlet slit of excitation and the sample and enable to control the wavelength of excitation at its maximum of energy by microrotation of the dispersion system.

12. A spectrometry apparatus as in claim 5, wherein said excitation source producing excitation energy is a laser.

13. A spectrometry apparatus as in claim 8 wherein said collector receiving energy diffused by the sample comprises an inlet diffusion slit.

14. A spectrometry apparatus as in claim 8, wherein said spectrally dispersed diffused energy is in a Raman emission.

15. A Raman spectrometry apparatus as in claim 5, wherein said optical train comprises, in part, said spectral dispersion system.

16. A Raman spectrometry apparatus as in claim 5, wherein said Raman energy selection device comprises a filter.

* * * * *

UNITED STATES PATENT AND TRADEMARK OFFICE
CERTIFICATE OF CORRECTION

PATENT NO. : 7,362,430 B2
APPLICATION NO. : 10/519529
DATED : April 22, 2008
INVENTOR(S) : Quy Dao Nguyen It is certified that error appears in the above-identified patent and that said Letters Patent is hereby corrected as shown below:

Title Page; item (73); should read,

Assignee: HORIBA JOBIN YVON S.A.S.

Signed and Sealed this
Thirteenth Day of September, 2011

David J. Kappos
*Director of the United States Patent and Trademark Office*